US012636967B2

(12) United States Patent
Zhou et al.

(10) Patent No.: US 12,636,967 B2
(45) Date of Patent: May 26, 2026

(54) METHOD AND DEVICE FOR TIMING SCHEDULED CHARGING, AND TERMINAL EQUIPMENT

(71) Applicant: GREAT WALL MOTOR COMPANY LIMITED, Hebei (CN)

(72) Inventors: Mingwang Zhou, Hebei (CN); Xuejing Yang, Hebei (CN); Shujiang Chen, Hebei (CN); Zhimeng Yuan, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 775 days.

(21) Appl. No.: 18/010,602

(22) PCT Filed: Sep. 30, 2021

(86) PCT No.: PCT/CN2021/122270
§ 371 (c)(1),
(2) Date: Dec. 15, 2022

(87) PCT Pub. No.: WO2022/089156
PCT Pub. Date: May 5, 2022

(65) Prior Publication Data
US 2023/0256857 A1      Aug. 17, 2023

(30) Foreign Application Priority Data
Oct. 29, 2020      (CN) .......................... 202011182660.8

(51) Int. Cl.
*H02J 7/00* (2026.01)
*B60L 53/60* (2019.01)
(Continued)

(52) U.S. Cl.
CPC ............... *B60L 53/66* (2019.02); *B60L 53/60* (2019.02); *B60L 53/68* (2019.02); *B60L 58/12* (2019.02); *G06Q 10/02* (2013.01); *B60L 2260/40* (2013.01)

(58) Field of Classification Search
CPC .......... B60L 53/60; B60L 53/66; B60L 53/68; B60L 58/12; G06Q 10/02
(Continued)

(56) References Cited

U.S. PATENT DOCUMENTS

2013/0096751 A1      4/2013  Riley et al.
2016/0297313 A1*    10/2016  Ono ........................ H02J 3/322

FOREIGN PATENT DOCUMENTS

CN          2874891 Y      2/2007
CN        102529737 A      7/2012
(Continued)

OTHER PUBLICATIONS

The Extended European Search Report dated Nov. 17, 2023 corresponding to application No. 21884885.1-1012.

*Primary Examiner* — Zixuan Zhou
(74) *Attorney, Agent, or Firm* — Nath, Goldberg & Meyer; Joshua B. Goldberg

(57) ABSTRACT

Provided are a method and a device for timing a scheduled charging, and a terminal device. The method for timing a scheduled charging comprises steps of: acquiring, in response to a condition that a charging gun is connected, a scheduled-charging start time for equipment and a first current-absolute-time at which a connection of the charging gun is completed; determining a first time duration to the scheduled-charging start time according to the scheduled-charging start time and the first current-absolute-time; performing a compensation on the first time duration to obtain a second time duration, and starting a timing; and terminat- (Continued)

ing the timing, when the second time duration is reached, and waking up the equipment.

19 Claims, 3 Drawing Sheets

(51) Int. Cl.
*B60L 53/66* (2019.01)
*B60L 53/68* (2019.01)
*B60L 58/12* (2019.01)
*G06Q 10/02* (2012.01)

(58) Field of Classification Search
USPC ............................................. 320/109; 701/22
See application file for complete search history.

(56) References Cited

FOREIGN PATENT DOCUMENTS

| | | | |
|---|---|---|---|
| CN | 103620910 | A | 3/2014 |
| CN | 105071786 | A | 11/2015 |
| CN | 105573106 | A | 5/2016 |
| CN | 105762848 | A | 7/2016 |
| CN | 107244245 | A | 10/2017 |
| CN | 107273986 | A | 10/2017 |
| CN | 107672469 | A | 2/2018 |
| CN | 107704938 | A | 2/2018 |
| CN | 107719180 | A | 2/2018 |
| CN | 109164694 | A | 1/2019 |
| CN | 109635976 | A | 4/2019 |
| CN | 109733228 | A | 5/2019 |
| CN | 109955675 | A | 7/2019 |
| CN | 110071338 | A | 7/2019 |
| CN | 110271436 | A | 9/2019 |
| CN | 110386031 | A | 10/2019 |
| CN | 110682822 | A | 1/2020 |
| CN | 210669545 | U | 6/2020 |
| CN | 111490305 | A | 8/2020 |
| JP | H05110735 | A | 4/1993 |
| KR | 20180052850 | A | 5/2018 |
| TW | 201719550 | A | 6/2017 |
| WO | 2012157096 | A1 | 11/2012 |
| WO | 2020043490 | A1 | 3/2020 |

* cited by examiner

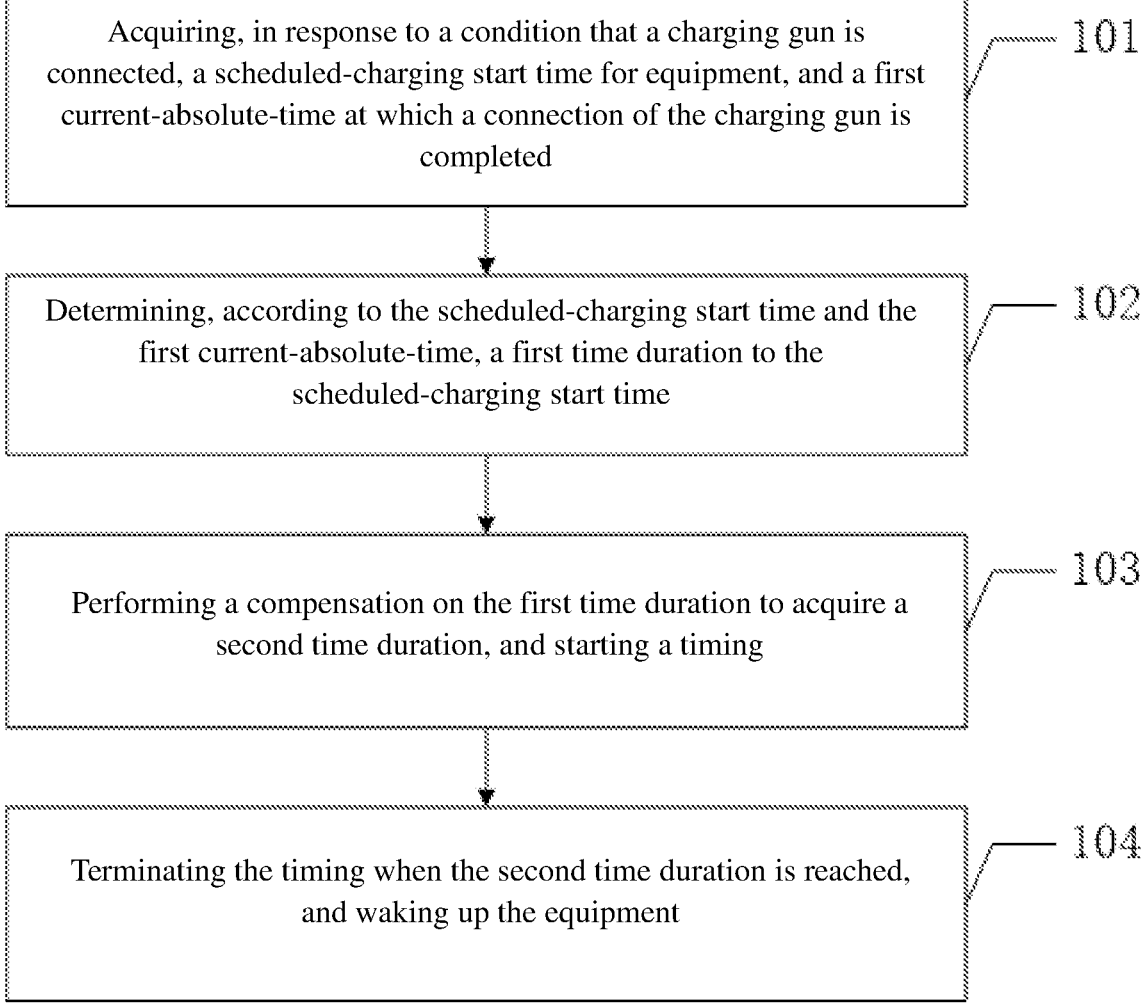

Acquiring, in response to a condition that a charging gun is connected, a scheduled-charging start time for equipment, and a first current-absolute-time at which a connection of the charging gun is completed — 101

Determining, according to the scheduled-charging start time and the first current-absolute-time, a first time duration to the scheduled-charging start time — 102

Performing a compensation on the first time duration to acquire a second time duration, and starting a timing — 103

Terminating the timing when the second time duration is reached, and waking up the equipment — 104

FIG. 1

METHOD AND DEVICE FOR TIMING SCHEDULED CHARGING, AND TERMINAL EQUIPMENT

CROSS-REFERENCE TO RELATED APPLICATIONS

This is a National Phase Application filed under 35 U.S.C. 371 as a national stage of PCT/CN2021/122270, filed Sep. 30, 2021, an application claiming the benefit of Chinese Application No. 202011182660.8, filed Oct. 29, 2020, the content of each of which is hereby incorporated by reference in its entirety.

FIELD

The present disclosure relates to the field of equipment charging technology, and in particular relates to a method and a device for timing a scheduled charging and a terminal equipment.

BACKGROUND

New energy vehicles, especially hybrid and pure electric models, have added a function of scheduled charging for different drivers' time and usage habits. As the vehicles become more intelligent, the customers have higher and higher requirements for the scheduled charging, it is not only required that the scheduled charging can be implemented according to the parameters set by the customers, but also required that the scheduled charging starts at the time set by the customers as exactly as possible.

However, RC oscillation circuit is used as a timing component for the scheduled charging function of vehicles at present, and the timing error is about 5%-10%. The scheduled charging can be reserved for charging at any time within a week, so the maximum timing time for scheduled charging is 7 (days)*24 (hours)*60 (minutes)=10080 (minutes), at this time, the error of the timing component is ±504 minutes to ±1008 minutes. In this way, an error between the vehicle-wake-up-charging start time and the scheduled-charging start time set by a driver is large, which is difficult to be accepted by the driver.

SUMMARY

In view of this, embodiments of the present disclosure provide a method and a device for timing a scheduled charging, and a terminal equipment, aiming to solve the problem that a large error is occurred between the vehicle-wake-up-charging start time and the scheduled-charging start time set by the driver in the existing technologies.

To achieve the above objective, a first aspect of embodiments of the present disclosure provides a method for timing a scheduled charging. The method includes the following steps: acquiring, in response to a condition that a charging gun is connected, a scheduled-charging start time for equipment, and a first current-absolute-time at which a connection of the charging gun is completed; determining, according to the scheduled-charging start time and the first current-absolute-time, a first time duration to the scheduled-charging start time; performing a compensation on the first time duration to obtain a second time duration, and starting a timing; and terminating the timing, when the second time duration is reached, and waking up the equipment.

As another embodiment of the present disclosure, after the equipment is woken up, the method also includes steps of: acquiring a second current-absolute-time at which a wake-up signal is received by the equipment; determining a difference value between the second current-absolute-time and the scheduled-charging start time; and sending, in response to a condition that the difference value is smaller than a preset threshold, a start-charging signal to a first unit to charge the equipment.

As another embodiment of the present disclosure, the first unit is a vehicle control unit (VCU).

As another embodiment of the present disclosure, the method also includes the following steps: redetermining the first time duration using the second current-absolute-time as the first current-absolute-time, when the difference value is greater than or equal to the preset threshold, and performing subsequent steps in sequence until a new difference value is smaller than the preset threshold, and then sending the start-charging signal to the first unit to charge the equipment.

As another embodiment of the present disclosure, the step of acquiring a second current-absolute-time at which a wake-up signal is received by the equipment, includes steps of: sending the wake-up signal to a second unit of the equipment; sending a request signal for acquiring a current-absolute-time to a third unit of the equipment capable of acquiring the current-absolute-time; and receiving the second current-absolute-time sent by the third unit.

As another embodiment of the present disclosure, the second unit and the third unit are both a head unit system (HUT).

As another embodiment of the present disclosure, the wake-up signal and the request signal are transmitted via a controller area network (CAN) bus.

As another embodiment of the present disclosure, the step of determining, according to the scheduled-charging start time and the first current-absolute-time, a first time duration to the scheduled-charging start time, includes a step of determining the first time duration to the scheduled-charging start time based on an equation of: $T_2 = T_{sch} - T_1$, where $T_2$ represents the first time duration, $T_{sch}$ represents the scheduled-charging start time, and $T_1$ represents the first current-absolute-time.

As another embodiment of the present disclosure, the step of performing a compensation on the first time duration to obtain a second time duration includes steps of acquiring a compensation coefficient being determined based on an actual error of a first timing component used for timing; and determining the second time duration through a calculation according to the compensation coefficient and the first time duration.

As another embodiment of the present disclosure, the step of performing a compensation on the first time duration to obtain a second time duration includes a step of determining the second time duration through a calculation based on a formula of: $T_3 = T_2 \cdot 0.1 \cdot P$, where $T_3$ represents the second time duration, $T_2$ represents the first time duration and P represents the compensation coefficient.

As another embodiment of the present disclosure, the timing is implemented by a fourth unit of the equipment, and the fourth unit includes a second timing component.

As another embodiment of the present disclosure, the fourth unit is a battery management system (BMS).

In accordance with a second aspect of embodiments of the present disclosure, a device for timing a scheduled charging is provided, which includes an acquisition module, a calculation module, a timing module, and a processing module.

The acquisition module is configured to acquire, in response to a condition that a charging gun, is connected a scheduled-charging start time for equipment, and a first current-absolute-time at which a connection of the charging gun is completed;

The calculation module is configured to calculate, according to the scheduled-charging start time and the first current-absolute-time, a first time duration to the scheduled-charging start time;

The timing module is configured to start a timing, and configured to end the timing when the second time duration is reached; and The processing module is configured to wake up the equipment.

The calculation module is also configured to carry out a compensation on the first time duration to obtain a second time duration.

In accordance with a third aspect of embodiments of the present disclosure, a terminal equipment is provided, which includes: a memory, a processor, and a computer program stored in the memory and executable by the processor, the processor when executing the computer program, is configured to implement steps described in the method for timing a scheduled charging as described in any of the above embodiments.

In accordance with a fourth aspect of embodiments of the present disclosure, a computer readable storage medium is provided. In the computer readable storage medium, a computer program is stored, the computer program, when being executed by a processor, causes the steps as described in the method for timing a scheduled charging as described in any of the above embodiments to be implemented.

Beneficial effect of the embodiments of the present disclosure, compared with the existing technologies, is that: the present disclosure addresses the current problem of using RC oscillation circuit timing components having large timing errors and being unable to wake up the vehicle for charging within an allowable error range, and provides a precision compensation for the timing strategy to ensure that the equipment is woken up by the timing component at the scheduled-charging start time or before the scheduled-charging start time. After the equipment is woken up, a current-absolute-time can be acquired from the equipment, the timing of the timing component is compared with the current-absolute-time to correct its own timing, thereby eliminating the timing error, ensuring that the scheduled charging is performed on time and thus customer complaints are reduced.

BRIEF DESCRIPTION OF THE DRAWINGS

In order to illustrate solutions in the embodiments of the present disclosure more clearly, the following will briefly introduce the drawings required to be used in the description of the embodiments or the existing technologies. Obviously, the drawings in the following description are only some embodiments of the present disclosure, and for a person of ordinary skill in the art, other drawings may also be obtained according to these drawings without any creative labor.

FIG. 1 is a schematic diagram of a process for implementing a method for timing a scheduled charging in accordance with an embodiment of the present disclosure.

DETAILED DESCRIPTION OF THE EMBODIMENTS

Figure 2:
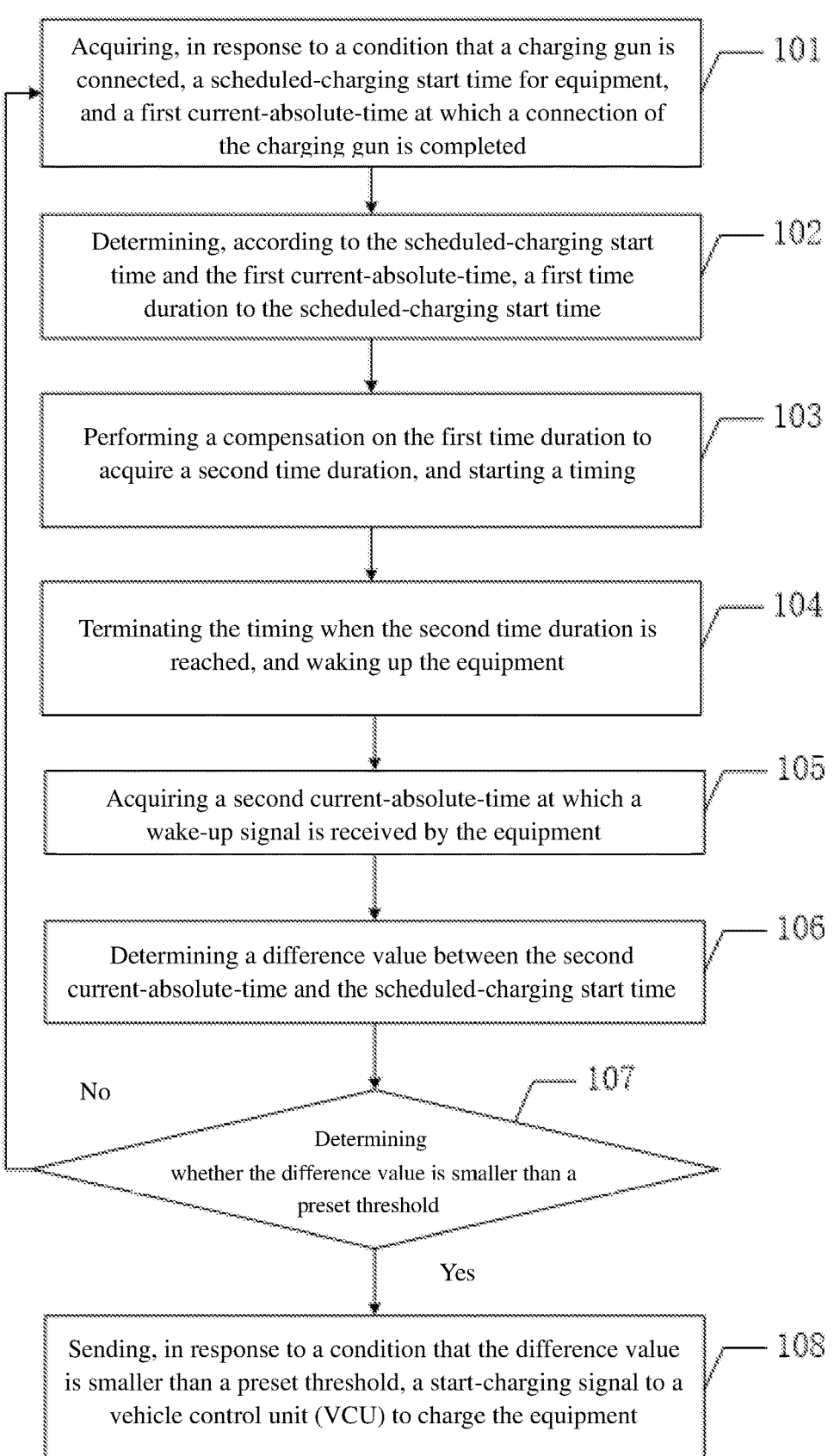
FIG. 2 is a schematic diagram of a process for implementing another method for timing a scheduled charging in accordance with an embodiment of the present disclosure.

In the following description, specific details such as particular system structures, techniques, and the like are presented for the purpose of illustration rather than limitation, to provide a thorough understanding of embodiments of the present disclosure. However, it should be understood for those of ordinary skills in the art that the present disclosure can be implemented in other embodiments without these specific details. In other cases, detailed descriptions of well-known systems, devices, circuits, and methods are omitted so that unnecessary details do not interfere with the description of the present disclosure.

Solutions of the present disclosure are described below with reference to specific embodiments.

FIG. 1 is a schematic diagram of a process for implementing a method for timing a scheduled charging provided by an embodiment of the present disclosure, as described in detail below.

In step 101, a scheduled-charging start time for equipment, and a first current-absolute-time at which a connection of a charging gun is completed, are acquired, in response to a condition that the charging gun is connected.

In this embodiment, a detailed description of the method for making a reservation for charging timing for new energy vehicles, especially hybrid and pure electric vehicle models, is provided.

In this embodiment, the vehicle will be woken up through the connection of the charging gun, and when the connection of the charging gun is detected by a timing component, the timing component starts to acquire the first current-absolute-time when the connection of the charging gun is completed and the scheduled-charging start time of the vehicle. Here, the first current-absolute-time is maned to distinguish it from the subsequently acquired absolute time at that time.

The scheduled-charging start time is a start time at which a user or driver wishes to charge the vehicle.

Optionally, the step of acquiring the first current-absolute-time includes sending a request signal to a head unit system (HUT), via a controller area network (CAN), to acquire a current-absolute-time at which the connection of the charging gun is completed; and then the current-absolute-time sent by the HUT is received and recorded as the first current-absolute-time.

In step 102, a first time duration to the scheduled-charging start time is calculated based on the scheduled-charging start time and the first current-absolute-time.

Optionally, the first time duration is a time duration to the start time of charging estimated based on the first current-absolute-time, to adjust a deviation of the first time duration sent by a battery management system (BMS) to reduce the error between an actual-charging start time and the scheduled-charging start time, and improve the user experience.

Optionally, the first time duration to the scheduled-charging start time is calculated according to the following equation: $T_2 = T_{sch} - T_1$.

Where, $T_2$ represents the first time duration, $T_{sch}$ represents the scheduled-charging start time, and $T_1$ represents the first current-absolute-time.

In step 103, the first time duration is compensated to obtain a second time duration and the timing is started.

In this embodiment, the RC oscillation circuit is adapted as a timing component, and the timing error is generally ±5% to ±10%, if the timing error of the timing components is ±10% and an expected-charging start time is 7 days*24 hours*60 minutes, then the maximum timing error is approximate ±1008 minutes, which means that the vehicle will be woken up by the timing component 1008 minutes earlier, a large error is occurred between the vehicle-wake-up-charging start time and the scheduled-charging start time set by a driver, so it is necessary to use the method provided in this disclosure to reduce a timing error and ensure that the actual-charging time and reservation-charging time set by the user are the same.

Optionally, the step 103 may also include steps of: acquiring a compensation coefficient determined based on an actual error of the timing component used for timing; and determining the second time duration based on the compensation coefficient and the first time duration.

For example, the compensation coefficient is in a range that is greater than 0 and smaller than or equal to 1. The RC oscillation circuits of different components or different suppliers have different timing errors, so the compensation coefficient is different, and is determined according to the actual error of the timing components used for timing.

Optionally, the step 103 may also include a step of performing a calculation based on the following formula: $T_3=T_2 \cdot 0.1 \cdot P$, to obtain the second time duration, where, $T_3$ represents the second time duration, $T_2$ represents the first time duration, and P represents the compensation coefficient, which can be calibrated to a value within 0 to 1 depending on the timing errors of the RC oscillation circuits of different components or different suppliers.

In step 104, the timing is terminated when the second time duration is reached, and the equipment is woken up.

To ensure that the actual start time for charging the vehicle is closer to the scheduled-charging start time set by the user and to improve the user experience, the following process, including step 105 to step 108, may be further performed, after the step 104, as shown in FIG. 2.

In the step 105, a second current-absolute-time at which a wake-up signal is received by the equipment, is acquired.

Optionally, the step 105 may include steps of: sending a CAN signal to the on-board host (HUT), the CAN signal includes a signal to wake up equipment and a request signal for acquiring a current-absolute-time at which the wake-up signal is received by the equipment; and receiving the second current-absolute-time sent by the HUT.

In the step 106, a difference value between the second current-absolute-time and a preset-charging start time is calculated.

In the step 107, it is detected whether the difference value is smaller than a preset threshold.

Optionally, the preset threshold can be set according to actual needs, and the value of the preset threshold is not restricted in this embodiment.

If the difference value is smaller than the preset threshold, the step 108 is performed; and if the difference value is greater than or equal to the preset threshold, then the step 101 is re-performed, and subsequent steps 102 to 107 of step 101 are performed sequentially until the difference value is smaller than the preset threshold. This is a cyclic process. In this process, the current-absolute-time will be acquired, by the BMS, from the HUT several times, and compared with the scheduled-charging start time, the current-absolute-time will gradually approach the scheduled-charging start time, until the difference between the two is smaller than the preset threshold (which may be set to 2 minutes), then the scheduled-charging start time is considered to be reached. It thus is ensured that the actual-charging start time is consistent with the user's desired charging start time, thereby the user experience is improved.

It should be noted that if the current-absolute-time acquired, by the BMS, from HUT greatly exceeds the scheduled-charging start time, the difference value between the current-absolute-time and the scheduled-charging start time will continue to increase, and the condition that the difference is smaller than the preset threshold cannot be reached, and the above cycle will become an infinite cycle. The above formula, i.e., $T_3=T_2 \cdot 0.1 \cdot P$, can effectively solve this problem. $T_3$ represents the second time duration, and in this formula, $T_3$ is greatly reduced, thus the time elapsed for the BMS to acquire the current-absolute-time from the HUT is reduced, thereby ensuring that the BMS acquires the current-absolute-time from the HUT before the charging reservation time comes, avoiding the current-absolute-time from exceeding the scheduled-charging start time, it thus is ensured that the above infinite-cycle situation will not be occurred and the method provided by the present disclosure can be performed smoothly.

In the step 108, a start-charging signal is sent to a vehicle control unit (VCU) to charge the equipment, in response to a condition that the difference value is smaller than the preset threshold.

Optionally, when the difference value is greater than or equal to the preset threshold, the second current-absolute-time is used as the first current-absolute-time to recalculate the first time duration, and subsequent steps are performed sequentially until the new difference value is smaller than the preset threshold, the start-charging signal is sent to the VCU to charge the equipment.

As shown in Table 1, a statistical table of timing error is provided. Since the scheduled charging can be timed for a week (7 days) at most, the maximum time for timing of the timing component is 10080 minutes. If the timing error is required to be within 2 minutes (i.e., the preset threshold is 2 minutes), then it is only necessary to wake up the vehicle at most 4 times in a week to ensure that the vehicle is woken up by the timing components at the scheduled-charging start time set by the driver within a timing error of 2 minutes. This reduces the problem of not waking up on time due to the error of the timing component itself.

It should be noted that, a process from step 101 to step 107, until the step 101 is re-performed in case that the difference is greater than or equal to the preset threshold, that is counted as waking up the vehicle once. When the step 107 is performed again, the difference is still greater than or equal to the preset threshold and continue to perform step 101, that is, waking up the vehicle twice, and so on.

TABLE 1

| Days of reservation/day | Time for timing/min | Number of wake-up/time | Error in timing/min |
|---|---|---|---|
| 1 | 1440 | 3 | 1.44 |
| 2 | 2880 | 4 | 0.288 |
| 3 | 4320 | 4 | 0.432 |
| 4 | 5760 | 4 | 0.576 |
| 5 | 7200 | 4 | 0.72 |
| 6 | 8640 | 4 | 0.864 |
| 7 | 10080 | 4 | 1.008 |

In the above method for timing the scheduled charging, after the connection of the charging gun is detected, the first time duration from the first current-absolute-time to the scheduled-charging start time is calculated based on the scheduled-charging start time and the first current-absolute-time at which the connection of the charging gun is completed. The first time duration is compensated to obtain the second time duration and then the timing is started. The timing is terminated when the second time duration is reached to wake up the equipment. Due to the compensation to the first time duration, it is ensured that the first current-absolute-time is acquired before the scheduled-charging start time. The second current-absolute-time at which the wake-up signal is received by the equipment is acquired, and the difference value between the second current-absolute-time and the preset-charging start time is calculated. The start-charging signal is sent to the vehicle control unit (VCU) to charge the equipment in response to the condition that the difference value is smaller than a preset threshold. When the difference value is greater than or equal to the preset threshold, the second current-absolute-time is used as the first current-absolute-time to recalculate the first time duration, and subsequent steps are performed sequentially until the new difference value is smaller than the preset threshold, and the start-charging signal is sent to the VCU to charge the equipment. The solution provided by an embodiment of the present disclosure only needs to wake up the vehicle at most 4 times, and the maximum error can be controlled within 1.68 minutes, thus the timing error can further be greatly reduced, thereby avoiding a case that the vehicle is not charged on time which affects the user experience.

It should be understood that the size of the serial numbers of the steps in the above embodiments does not imply the order of execution, and the order of execution of each process should be determined by its function and inherent logic, and should not constitute any limitation to the implementation process of the embodiments of the present disclosure.

Figure 3:
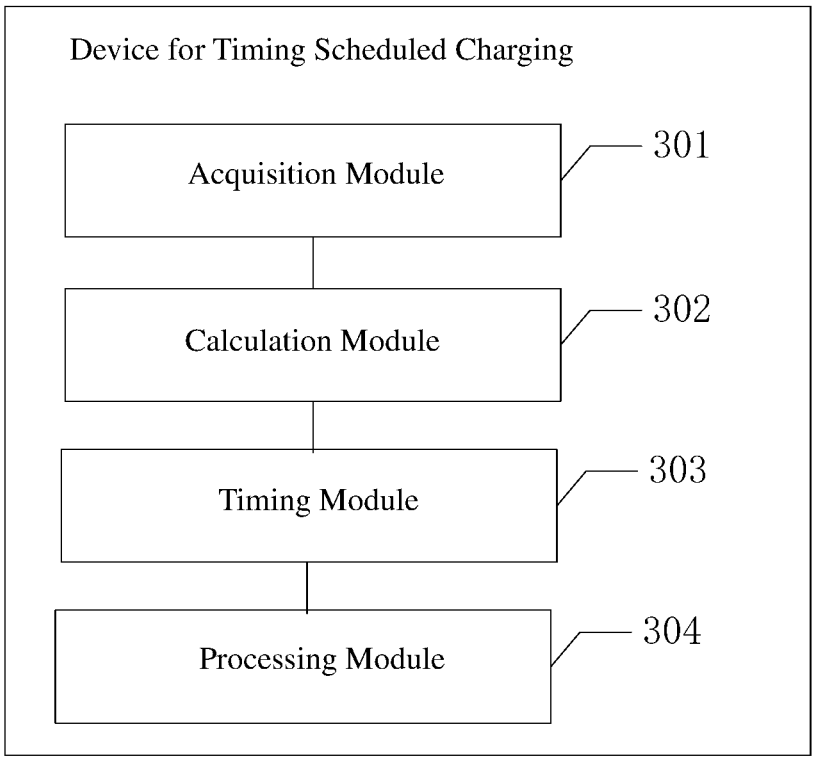
FIG. 3 an exemplary diagram of a device for timing a scheduled charging in accordance with an embodiment of the present disclosure.

Corresponding to the method for timing a scheduled charging described in the above embodiment, FIG. 3 illustrates an exemplary diagram of a device for timing a scheduled charging in accordance with an embodiment of the present disclosure. As shown in FIG. 3, the device may include: an acquisition module 301, a calculation module 302, a timing module 303, and a processing module 304.

The acquisition module 301 is configured to acquire, when a connection of a charging gun is detected, a scheduled-charging start time for equipment and a first current-absolute-time at which the connection of the charging gun is completed.

The calculation module 302 is configured to calculate, according to the scheduled-charging start time and the first current-absolute-time, a first time duration to the scheduled-charging start time.

The calculation module 302, is also configured to carry out a compensation on the first time duration to obtain a second time duration.

The timing module 303 is configured to start a timing, and to end the timing when the second time duration is reached.

The processing module 304 is configured to wake up the equipment.

Optionally, when the calculation module 302 calculates, based on the scheduled-charging start time and the first current-absolute-time, a first time duration to the scheduled-charging start time, the calculation module 302 is configured to calculate the first time duration to the scheduled-charging start time based on the following equation: $T_2=T_{sch}-T_1$.

Where, $T_2$ represents the first time duration, $T_{sch}$ represents the scheduled-charging start time, and $T_1$ represents the first current-absolute-time.

Optionally, when the calculation module 302 carries out a compensation on the first time duration to obtain a second time duration, the calculation module 302 may be configured to acquire a compensation coefficient being determined on the basis of an actual error of a timing component used for timing; and to acquire a second time duration calculated on the basis of the compensation coefficient and the first time duration.

Optionally, when the calculation module 302 carries out a compensation on the first time duration to obtain a second time duration, the calculation module 302 may be configured to perform a calculation based on the following formula: $T_3=T_2 \cdot 0.1 \cdot P$, to obtain the second time duration.

Where, $T_3$ represents the second time duration, $T_2$ represents the first time duration and P represents the compensation coefficient.

Optionally, after the equipment is woken up, the following operations are included.

The acquisition module 301 is also configured to acquire a second current-absolute-time at which a wake-up signal is received by the equipment.

The calculation module 302 is also configured to calculate a difference value between the second current-absolute-time and a preset-charging start time.

The processing module 304 is also configured to send a start-charging signal to a vehicle control unit (VCU) to charge the equipment in response to a condition that the difference value is smaller than a preset threshold.

Optionally, when the difference value is greater than or equal to the preset threshold, the second current-absolute-time is used as the first current-absolute-time to recalculate the first time duration and subsequent steps are performed in turn until a new difference value is smaller than the preset threshold, then the start-charging signal is sent to the VCU to charge the equipment.

Optionally, when the acquisition module 301 acquires the second current-absolute-time, the acquisition module 301 may be configured to send a CAN signal to a on-board host (HUT), the CAN signal includes a signal to wake up equipment and a request signal to acquire the current-absolute-time at which the wake-up signal is received by the equipment; and receive a second current-absolute-time sent by the HUT.

In the above device for timing the scheduled charging, after the connection of the charging gun is detected, the first time duration to the scheduled-charging start time is calculated, by the calculation module, based on the scheduled-charging start time and the first current-absolute-time at which the connection of the charging gun is completed. The first time duration is compensated, by the calculation module, to obtain the second time duration, and then a timing is started by the timing module and terminated by the timing module when the second time duration is reached. The equipment is woken up by the processing module, due to the compensation of the first time duration, the timing errors can be reduced. The difference value between the second current-absolute-time and the preset-charging start time is calculated by the calculation module. In response to the condition that the difference value is smaller than the preset threshold, a start-charging signal is sent by the processing module to the VCU to charge the equipment. In case that the difference value is greater than or equal to the preset threshold, the second current-absolute-time is used as the first current-absolute-time to recalculate the first time duration, and subsequent steps are performed sequentially until the new difference value is smaller than the preset threshold, and the start-charging signal is sent to the VCU to charge the equipment. The solution provided by an embodiment of the present disclosure only needs to wake up the vehicle at most 4 times, and the maximum error can be controlled within 1.68 minutes, thus the timing error can further be greatly reduced, thereby avoiding a case that the vehicle is not charged on time which affects the user experience.

Figure 4:
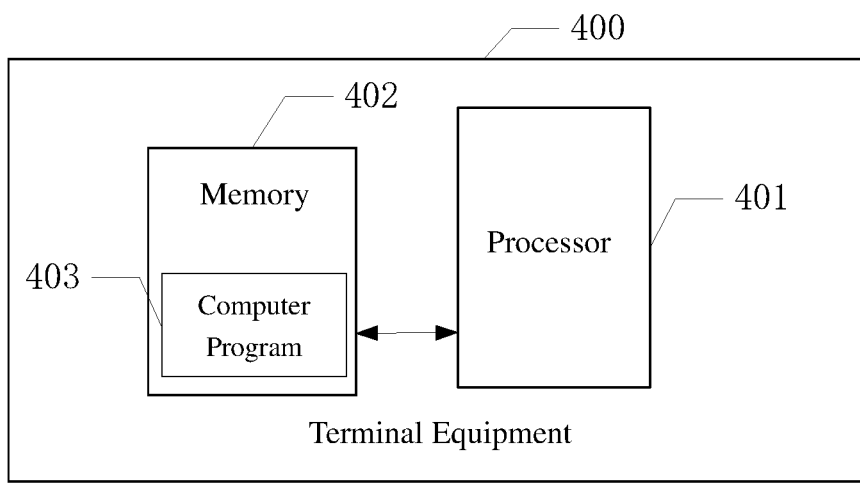
FIG. 4 a schematic diagram of a terminal equipment in accordance with an embodiment of the present disclosure.

FIG. 4 is a schematic diagram of a terminal equipment provided in an embodiment of the present disclosure. As shown in FIG. 4, the terminal equipment 400 in this embodiment includes: a processor 401, a memory 402, and a computer program 403 stored in the memory 402 and executable by the processor 401, such as a program for timing a scheduled charging. The processor 401, when executing the computer program 403, implements the steps in the method for timing the scheduled charging as described above, such as steps 101 to 104 shown in FIG. 1, or the steps shown in FIG. 2, and the processor 401 when executing the computer program 403 implements the functions of the modules in the respective device embodiment as described above, such as the functions of modules 301 to 304 shown in FIG. 3.

Exemplarily, the computer program 403 may be divided into one or more program modules, the one or more program modules being stored in the memory 402 and executed by the processor 401 to complete the present disclosure. The one or more program modules may be a series of computer program instruction segments capable of performing a particular function, which instruction segments are used to describe the execution of the computer program 403 in the device for scheduled charging timing or in the terminal equipment 400. For example, the computer program 403 may be divided into an acquisition module 301, a calculation module 302, a timing module 303, and a processing module 304, the specific functions of each module being shown in FIG. 3 and not repeated herein.

The terminal equipment 400 may be a computing device such as a desktop computer, a laptop, a handheld computer, and a cloud server. It can be understood by those skilled in the art that FIG. 4 is only an example of terminal equipment 400 and does not constitute a limitation of the terminal equipment 400, which may include more or fewer components than shown, or may include a combination of certain components, or different components, for example, the terminal equipment may also include input and output devices, network access devices, buses, etc.

The processor 401 may be a central processing unit (CPU), may also be other general-purpose processors, Digital Signal Processor (DSP), Application Specific Integrated Circuit (ASIC), Field-Programmable Gate Array (FPGA) or other programmable logic devices, discrete gate or transistor logic devices, discrete hardware components, etc. The general-purpose processor may be a microprocessor. Or the processor may also be any conventional processor, etc.

The memory 402 may be an internal storage unit of the terminal equipment 400, such as a hard disk or memory of the terminal equipment 400. The memory 402 may also be an external storage device of the terminal equipment 400, such as a plug-in hard disk equipped on the terminal equipment 400, a Smart Media Card (SMC), a Secure Digital (SD) card, a Flash Card, etc. Further, the memory 402 may include both internal storage units and external storage devices of the terminal equipment 400. The memory 402 is used to store the computer program and other programs and data required by the terminal equipment 400. The memory 402 may also be used to temporarily store data that has been output or will be output.

It would be clear to those skilled in the art that, for the sake of convenience and simplicity of description, only the above-mentioned division of each functional unit and module is illustrated by way of example. In practice, the above-mentioned functions can be assigned to be performed by different functional units and modules as needed, i.e., the internal structure of the device is divided into different functional units or modules to perform all or some of the above-mentioned functions. Each functional unit, module in the embodiment can be integrated in a processing unit, or each unit can physically exist separately, or two or more units can be integrated in a single unit, and the above integrated unit can be implemented either in the form of hardware or in the form of software functional units. In addition, the specific names of the functional units and modules are only for the purpose of mutual distinction and are not intended to limit the protection scope of the present disclosure. The specific working process of the units and modules in the above system may be referred to the corresponding process in the aforementioned method embodiments, which will not be repeated here.

In the above embodiments, the description of each embodiment has its own focus, and the parts that are not detailed or documented in a certain embodiment, reference may be made to the relevant descriptions of other embodiments.

A person of ordinary skill in the art may realize that the units and algorithmic steps of the examples described in connection with the embodiments disclosed herein may be implemented by electronic hardware, or through a combination of computer software and electronic hardware. Whether these functions are performed in hardware or software depends on the particular application and design constraints of the solutions. A skilled professional may use different methods to implement the described functions for each particular application, but such implementations should not be considered beyond the scope of the present disclosure.

In the embodiments provided by the present disclosure, it should be understood that the disclosed devices/terminal equipment and methods, may be implemented in other ways. For example, the device/terminal equipment embodiments described above are merely schematic, e.g., the division of the modules or units described is only a logical functional division, and the actual implementation may be divided in other ways, e.g., multiple units or components may be combined or may be integrated into another system, or some features may be ignored, or not implemented. Furthermore, the mutual coupling or direct coupling or communication connections shown or discussed may be indirect coupling or communication connections through some interface, device or unit, which may also be electrical, mechanical or other forms.

The units illustrated as separate components may or may not be physically separated, and the components shown as units may or may not be physical units, i.e., these units may be located in one place or may be distributed to a plurality of network units. Some or all of these units may be selected according to practical needs to achieve the purpose of solutions in the embodiments.

In addition, each functional unit in each embodiment of the present disclosure may be integrated in a single processing unit, or each unit may be physically present separately, or two or more units may be integrated in a single unit. the integrated units may be implemented either in the form of hardware or in the form of software functional units.

The integrated module/unit, when implemented in the form of a software functional unit and sold or used as a stand-alone product, may be stored in a computer readable storage medium. Based on this understanding, the present disclosure implements all or part of the processes in the above method embodiments, which may also be accomplished by means of a computer program to instruct the relevant hardware, the computer program may be stored in a computer readable storage medium which, when executed by a processor, causes the processor to implement the steps of each of the above method embodiments. Wherein the computer program includes computer program code, the computer program code may be in the form of source code, in the form of object code, in the form of an executable file or in some intermediate form, etc. The computer readable medium may include: any entity or device capable of carrying the computer program code, a recording medium, a USB flash drive, a removable hard disk, a diskette, an optical disk, a computer memory, a read-only memory (ROM), a random-access memory (RAM), an electrical carrier signal, a telecommunication signals, and software distribution media, etc. It should be noted that the contents of the computer readable medium may be added or subtracted as appropriate according to the requirements of legislation and patent practice in the jurisdiction, for example, in some jurisdictions, according to legislation and patent practice, the computer readable medium does not include electric carrier signals and telecommunication signals.

The above-described embodiments are merely used to illustrate the solutions of the present disclosure, and are not intended to limit the present application. Although the present disclosure is described in detail with reference to the foregoing embodiments, it should be understood for those of ordinary skill in the art that the solutions recorded in the foregoing embodiments may still be modified, or some features in the solutions may be equivalently substituted; and these modifications or substitutions do not make the essence of the corresponding solutions deviate from the principle and scope of the solutions of the embodiments of the present disclosure, thus shall all be included in the protection scope of the present disclosure.

What is claimed is:

1. A method for timing a scheduled charging, comprising:
   acquiring, in response to a condition that a charging gun is connected, a scheduled-charging start time for equipment, and a first current-absolute-time at which a connection of the charging gun is completed;
   determining, according to the scheduled-charging start time and the first current-absolute-time, a first time duration to the scheduled-charging start time;
   performing a compensation on the first time duration to obtain a second time duration, and starting a timing; and
   terminating the timing when the second time duration is reached, and waking up the equipment,
   wherein, after the equipment is woken up, the method for timing the scheduled charging further comprises:
   acquiring a second current-absolute-time at which a wake-up signal is received by the equipment;
   determining a difference value between the second current-absolute-time and the scheduled-charging start time; and
   sending, in response to a condition that the difference value is smaller than a preset threshold, a start-charging signal to a first unit to charge the equipment.

2. The method for timing the scheduled charging as claimed in claim 1, wherein the first unit is a vehicle control unit (VCU).

3. The method for timing the scheduled charging as claimed in claim 1, further comprising:
   redetermining the first time duration using the second current-absolute-time as the first current-absolute-time, when the difference value is greater than or equal to the preset threshold, and performing subsequent steps in sequence until a new difference value is smaller than the preset threshold, and then sending the start-charging signal to the first unit to charge the equipment.

4. The method for timing the scheduled charging as claimed in claim 1, wherein the acquiring the second current-absolute-time at which the wake-up signal is received by the equipment, comprises:
   sending the wake-up signal to a second unit of the equipment;
   sending a request signal for acquiring a current-absolute-time to a third unit of the equipment capable of acquiring the current-absolute-time; and
   receiving the second current-absolute-time sent by the third unit.

5. The method for timing the scheduled charging as claimed in claim 4, wherein the second unit and the third unit are both a head unit system (HUT).

6. The method for timing the scheduled charging as claimed in claim 4, wherein the wake-up signal and the request signal are transmitted via a controller area network (CAN) bus.

7. The method for timing the scheduled charging as claimed in claim 1, wherein the determining, according to the scheduled-charging start time and the first current-absolute-time, the first time duration to the scheduled-charging start time, comprises:
   determining the first time duration to the scheduled-charging start time based on an equation of: $T_2=T_{sch}-T_1$,
   wherein, $T_2$ represents the first time duration, $T_{sch}$ represents the scheduled-charging start time, and $T_1$ represents the first current-absolute-time.

8. The method for timing the scheduled charging as claimed in claim 1, wherein the performing the compensation on the first time duration to obtain the second time duration, comprises:
   acquiring a compensation coefficient, wherein the compensation coefficient is determined based on an actual error of a first timing component used for timing; and
   determining the second time duration through a calculation according to the compensation coefficient and the first time duration.

9. The method for timing the scheduled charging as claimed in claim 1, wherein the performing the compensation on the first time duration to obtain the second time duration comprises:
   determining the second time duration through a calculation based on a formula of: $T_3=T_2\cdot0.1\cdot P$,
   wherein $T_3$ represents the second time duration, $T_2$ represents the first time duration, and P represents a compensation coefficient.

10. The method for timing the scheduled charging as claimed in claim 1, wherein the timing is implemented by a fourth unit of the equipment, and the fourth unit comprises a second timing component.

11. The method for timing the scheduled charging as claimed in claim 10, wherein the fourth unit is a battery management system (BMS).

12. The method for timing the scheduled charging as claimed in claim 8, wherein the compensation coefficient is in a range that is greater than 0 and smaller than or equal to 1.

13. Terminal equipment, comprising a memory, a processor and a computer program stored in the memory and executable by the processor, wherein the processor, when executing the computer program, is configured to perform operations that comprises:

acquiring, in response to a condition that a charging gun is connected, a scheduled-charging start time for equipment, and a first current-absolute-time at which a connection of the charging gun is completed;

determining, according to the scheduled-charging start time and the first current-absolute-time, a first time duration to the scheduled-charging start time;

performing a compensation on the first time duration to obtain a second time duration, and starting a timing; and terminating the timing when the second time duration is reached, and waking up the equipment, wherein, after the equipment is woken up, the processor is further configured to perform operations that comprises:

acquiring a second current-absolute-time at which a wake-up signal is received by the equipment;

determining a difference value between the second current-absolute-time and the scheduled-charging start time; and sending, in response to a condition that the difference value is smaller than a preset threshold, a start-charging signal to a first unit to charge the equipment.

14. The terminal equipment as claimed in claim 13, the processor is further configured to perform operations that comprises:

redetermining the first time duration using the second current-absolute-time as the first current-absolute-time, when the difference value is greater than or equal to the preset threshold, and performing subsequent steps in sequence until a new difference value is smaller than the preset threshold, and then sending the start-charging signal to the first unit to charge the equipment.

15. The terminal equipment as claimed in claim 13, wherein the operation of acquiring the second current-absolute-time at which the wake-up signal is received by the equipment, comprises:

sending the wake-up signal to a second unit of the equipment;

sending a request signal for acquiring a current-absolute-time to a third unit of the equipment capable of acquiring the current-absolute-time; and receiving the second current-absolute-time sent by the third unit.

16. The terminal equipment as claimed in claim 13, wherein the operation of determining, according to the scheduled-charging start time and the first current-absolute-time, the first time duration to the scheduled-charging start time, comprises:

determining the first time duration to the scheduled-charging start time based on an equation of: $T_2 = T_{sch} - T_1$, wherein, $T_2$ represents the first time duration, $T_{sch}$ represents the scheduled-charging start time, and $T_1$ represents the first current-absolute-time.

17. The terminal equipment as claimed in claim 13, wherein the operation of performing the compensation on the first time duration to obtain the second time duration, comprises:

acquiring a compensation coefficient, wherein the compensation coefficient is determined based on an actual error of a first timing component used for timing; and determining the second time duration through a calculation according to the compensation coefficient and the first time duration.

18. The terminal equipment as claimed in claim 13, wherein the operation of performing the compensation on the first time duration to obtain the second time duration comprises:

determining the second time duration through a calculation based on a formula of: $T_3 = T_2 \cdot 0.1 \cdot P$, wherein $T_3$ represents the second time duration, $T_2$ represents the first time duration and P represents a compensation coefficient.

19. A non-transitory computer readable storage medium, in which a computer program is stored, wherein the computer program, when being executed by the processor, causes the processor to perform operations that comprises:

acquiring, in response to a condition that a charging gun is connected, a scheduled-charging start time for equipment, and a first current-absolute-time at which a connection of the charging gun is completed;

determining, according to the scheduled-charging start time and the first current-absolute-time, a first time duration to the scheduled-charging start time;

performing a compensation on the first time duration to obtain a second time duration, and starting a timing; and terminating the timing when the second time duration is reached, and waking up the equipment, wherein, after the equipment is woken up, the processor is further configured to perform operations that comprises:

acquiring a second current-absolute-time at which a wake-up signal is received by the equipment;

determining a difference value between the second current-absolute-time and the scheduled-charging start time; and sending, in response to a condition that the difference value is smaller than a preset threshold, a start-charging signal to a first unit to charge the equipment.

* * * * *